Aug. 21, 1934.  F. C. WERNER  1,971,087
COOKY MACHINE
Filed Aug. 5, 1933
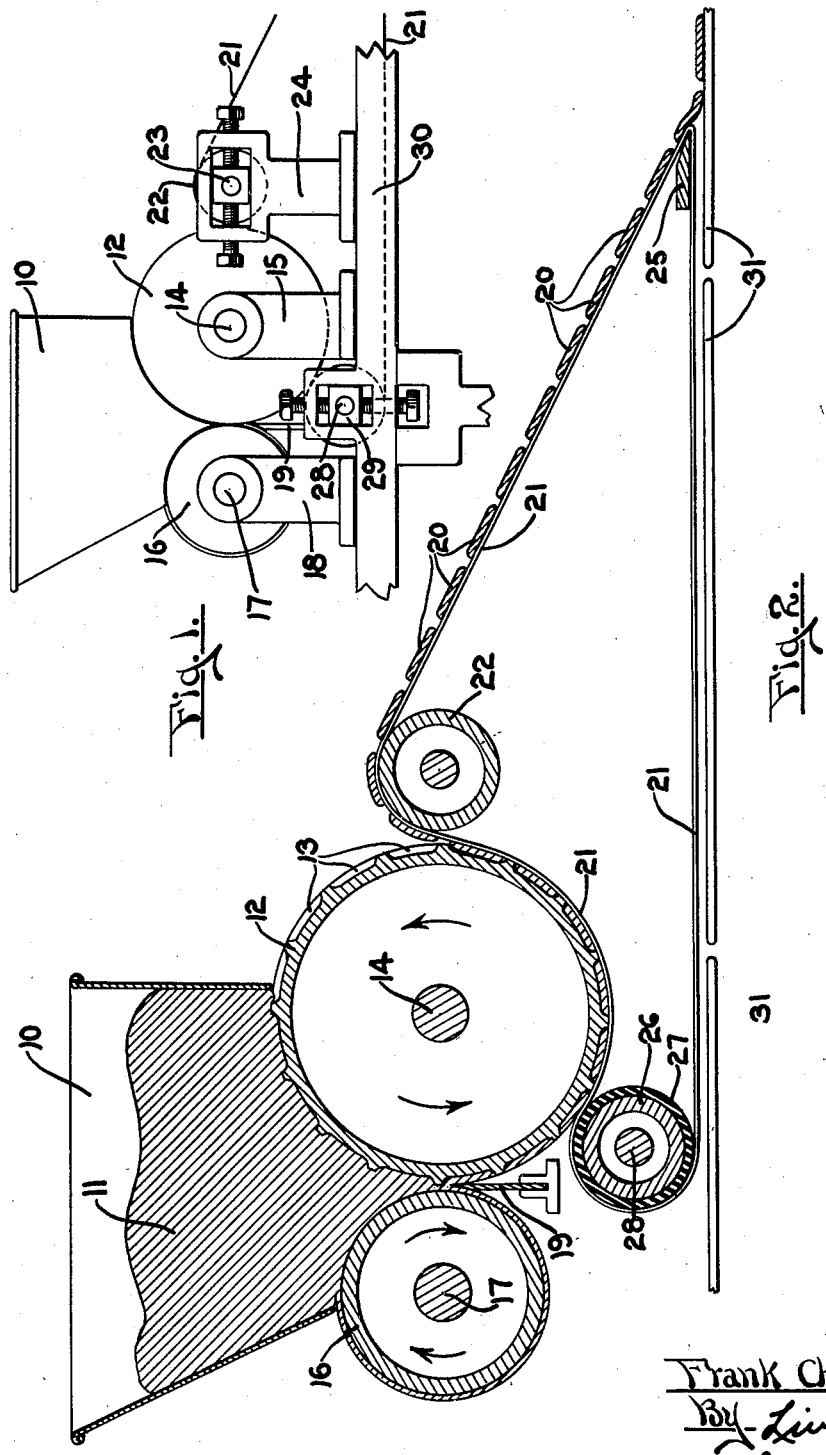
Inventor
Frank Charles Werner
By Livrana &
Van Antwerp
Attorneys Patented Aug. 21, 1934

1,971,087

UNITED STATES PATENT OFFICE 1,971,087

COOKY MACHINE

Frank Charles Werner, Grand Rapids, Mich.

Application August 5, 1933, Serial No. 683,808

3 Claims. (Cl. 107—8)

This invention relates generally to a cooky machine and more particularly to means for removing the formed cookies from the cooky die.

Present day machines have difficulty inasmuch as the cookies or the like oftentimes do not freely separate from their dies and 'it is one object of this invention to overcome this difficulty.

Briefly described, my invention relates to a transfer belt located adjacent to the cooky die drum, this transfer belt being preferably driven by contact with the dough located in the dies.

In the drawing:—

Fig. 1 is a side view of my invention.

Fig. 2 is a sectional view through the same.

Similar numerals refer to similar parts throughout the several views.

Numeral 10 indicates a hopper, carrying the dough 11 therein. A cooky die drum 12, formed with depressions or recesses 13 for receiving the dough and forming the cookies, is revolubly mounted upon the shaft 14 on the supporting means 15, the hopper 10 being cut away at its bottom, see Fig. 2, to receive a portion of the cooky dough drum 12.

A presser roll 16, mounted upon the shaft 17, carried by the supporting means 18, presses the dough into the recesses 13 of the cooky dough drum 12. A cutting blade or knife 19 removes the surplus dough from the cooky die drum.

A belt 21, preferably formed of canvas or the like, encircles an upper roll or drum 22 adjustably mounted at 23 upon supporting means 24, the stationary shoe 25 and a roll 26. This roll 26 has a rubber covering 27 therearound. The roll 26 is mounted upon the shaft 28 which is adjustably mounted at 29 upon the frame member 30, this frame member 30 also carrying the supporting means 15, 24 and 18, previously referred to.

*The operation*

The dough 11 is drawn downwardly between the cooky dough drum 22 and the presser roll 16, the blade 19 functioning to keep the formation of the cookies 20 in the die drum.

The roll 26 is so adjusted as to cause the rubber covering 27 to snugly roll against the die drum and thus the cookies 20 may be slightly compressed between the canvas belt 21 and the die drum.

The roll 22 has its outer face positioned a short distance from the outer face of the cooky die drum and consequently the transfer belt 21 runs in a straight line between the points of tangency on the roll 22 and the die drum.

The cookies 20 leave the die drum and are carried by the transfer belt 21, see Fig. 2, downwardly toward the shoe 25, leave the belt at this point to fall upon the moving pans 31 as will be understood.

The belt 21 is driven preferably only by frictional contact between the same and the several cookies in the cooky die drum, these several cookies or blanks being, of course, moved by means of the cooky die drum 12, the die drum being driven by any suitable means (not shown).

There are several features about my construction which are novel and some of these features are absolutely essential in order that perfect separation between the cooky blanks and the die drum may be had. These features include the rubber roll, which presses securely against the die drum, the encircling of the canvas belt around a quarter of the die drum's circumference, the withdrawal of the cookies from the die drum while in substantially a vertical position, and the straight belt positioning at this point of withdrawal. The combination of at least some of the several features, as well as perhaps some others, not appreciated at the present time, cause attainment of the results desired, the exact theory of the operation not being set forth.

Having thus revealed this invention, I claim as new and desire to secure the following combinations and elements, or equivalents thereof, by Letters Patent of the United States.

I claim:

1. In combination, a cooky die drum, means to insert dough into said dies, a transfer belt adapted to receive said cooky blanks from the said dies, and means to guide the transfer belt around the cooky die drum for approximately 90 degrees, said transfer belt leaving the die drum at a point approximately on the same horizontal plane as the axis of the die drum.

2. A combination of elements as set forth in claim 1 in which the guiding means for the transfer belt is so located as to cause the transfer belt to move in a straight line for a short distance after it leaves the die drum.

3. In combination, a cooky die drum, a roll mounted in the same horizontal plane as the drum, said roll being spaced from the said drum, a flexible carrier extending over the roll, means for maintaining the flexible carrier in contact with the said cooky drum, said last mentioned means being resilient for the purpose described.

FRANK CHARLES WERNER.